Feb. 1, 1966 R. S. RANDALL 3,231,974
BUTTER MEASURING AND DISPENSING APPARATUS
Filed Dec. 30, 1963 6 Sheets-Sheet 2
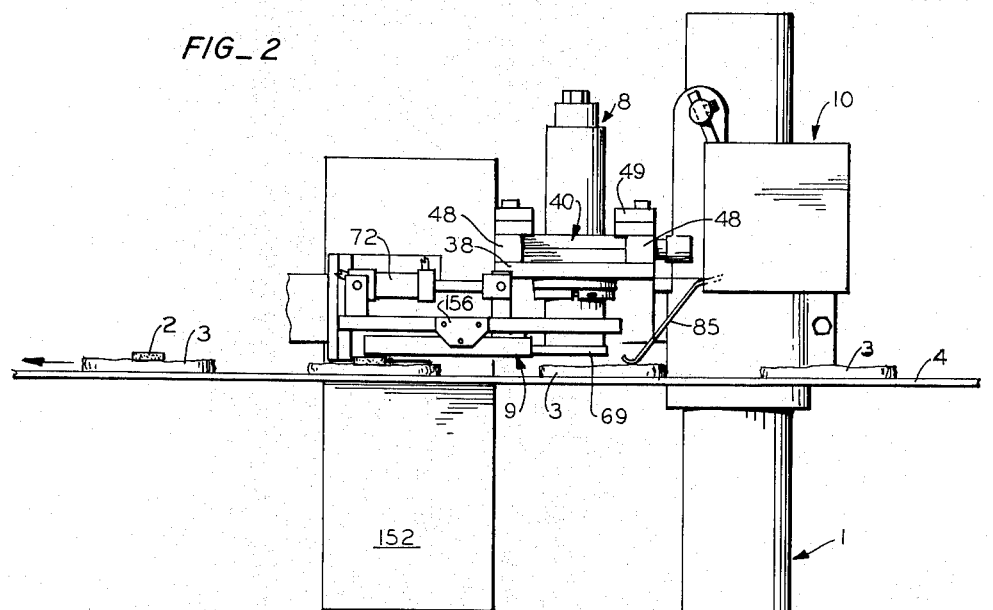
FIG_2
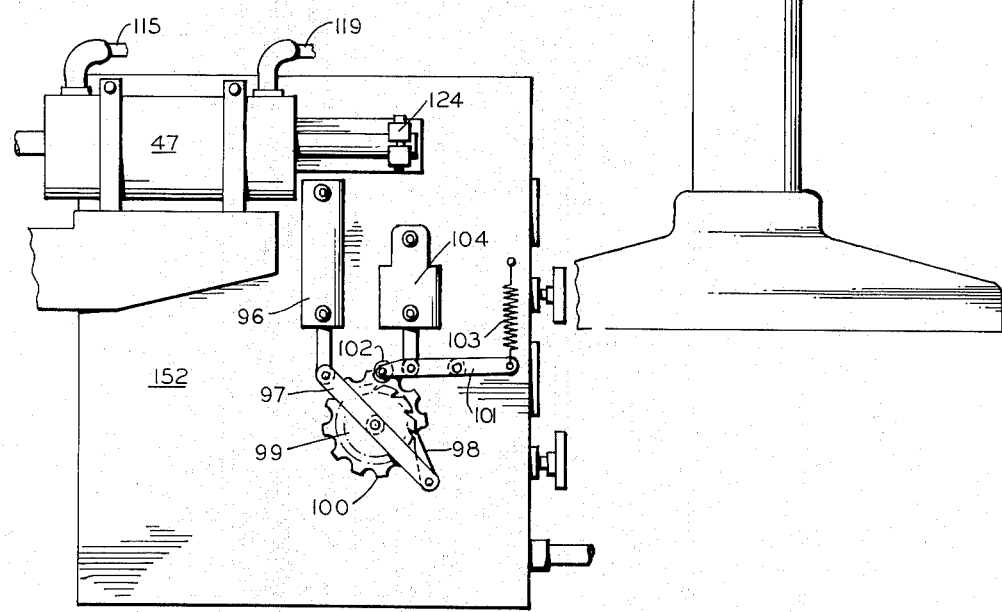
FIG_3
INVENTOR.
RALPH S. RANDALL
BY
*Boyken, Mohler & Foster*
ATTORNEYS

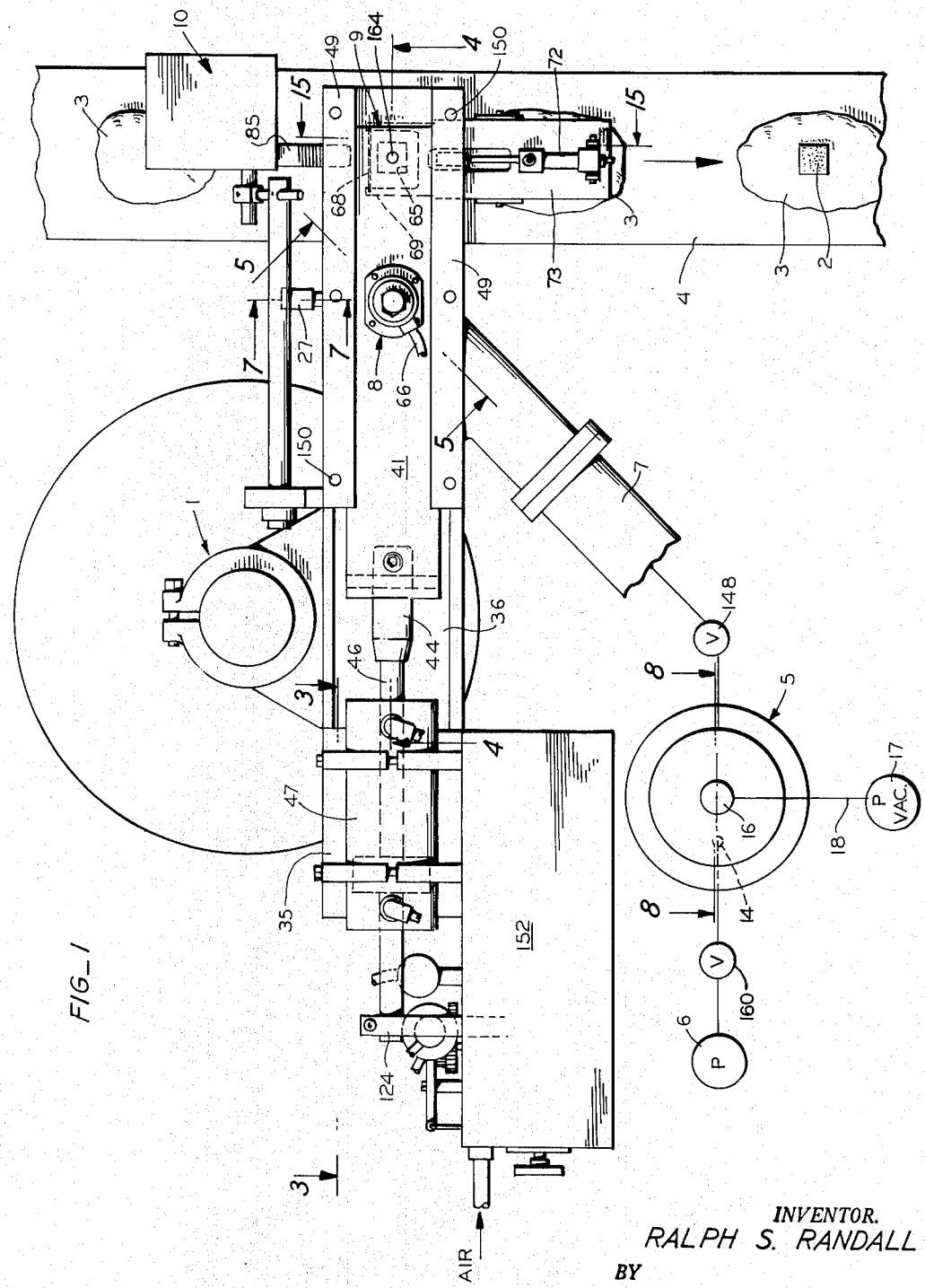

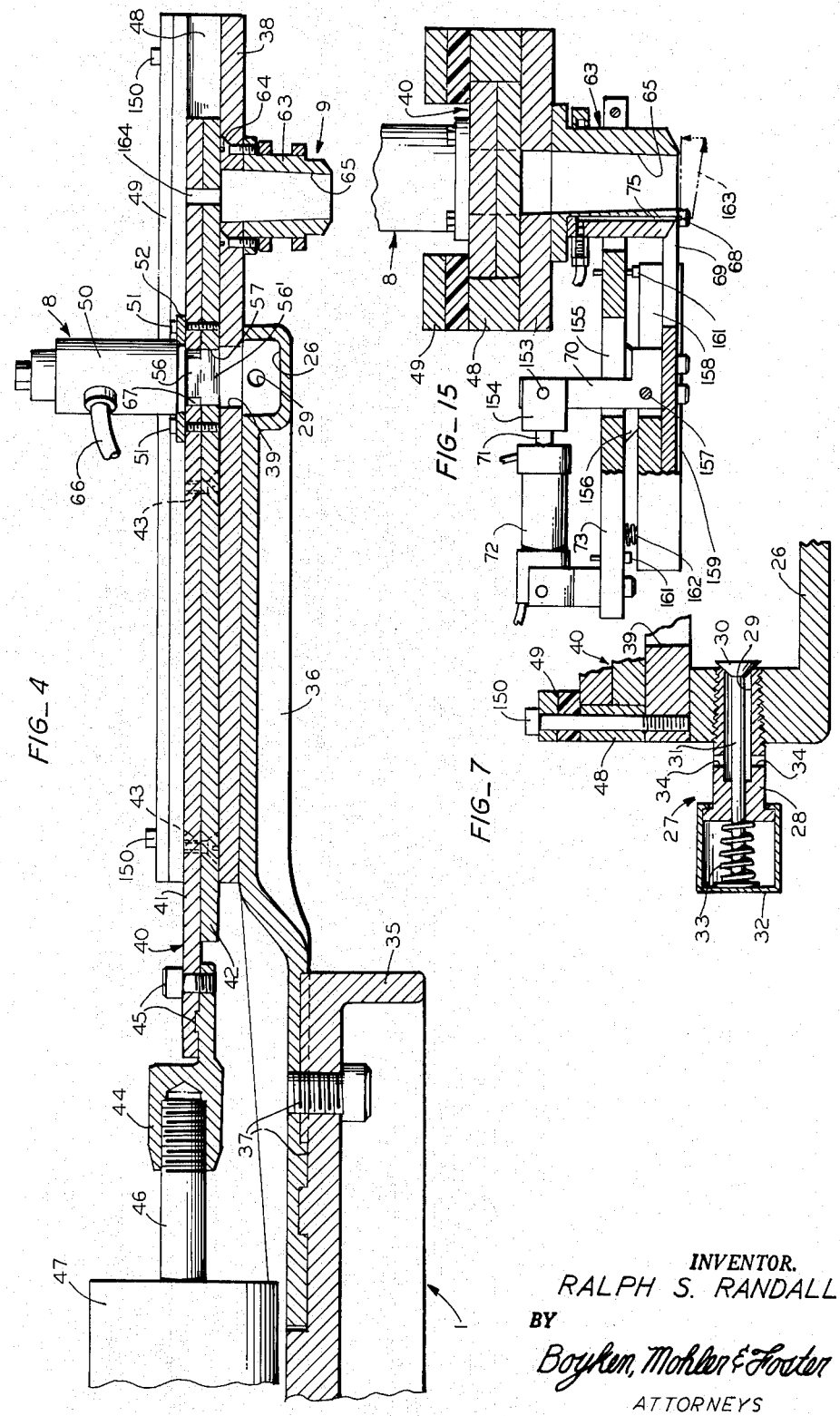

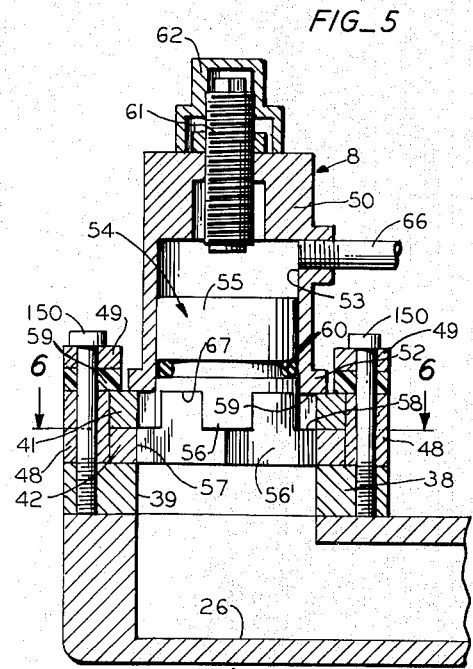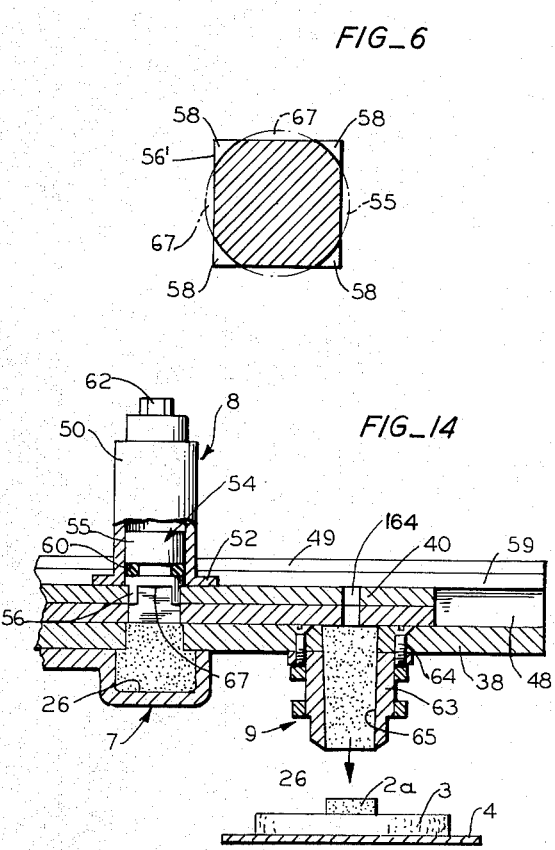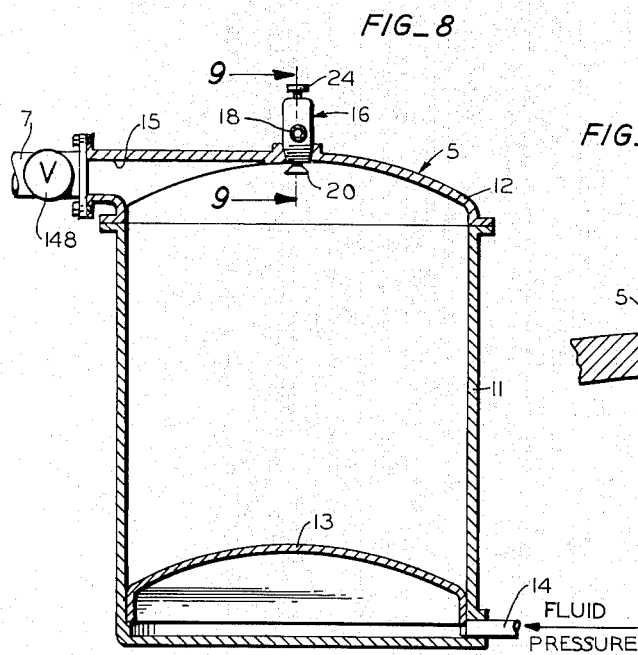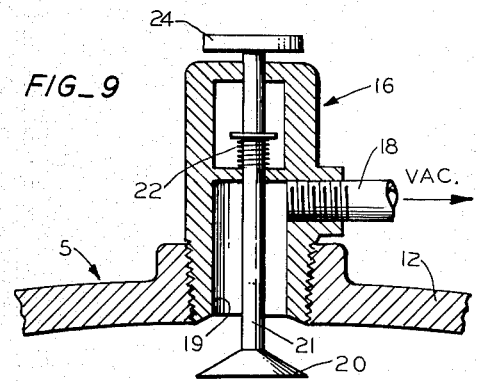

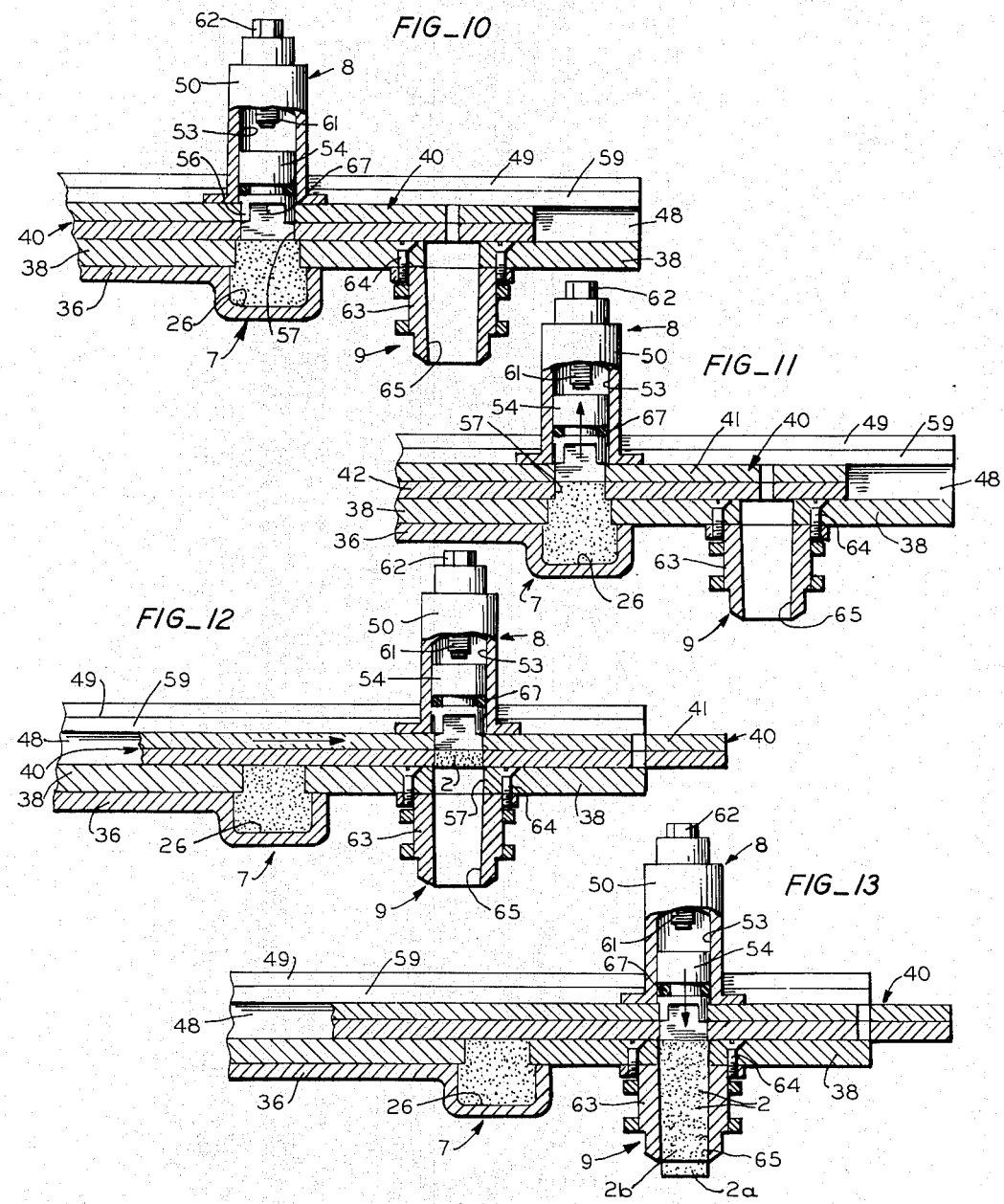

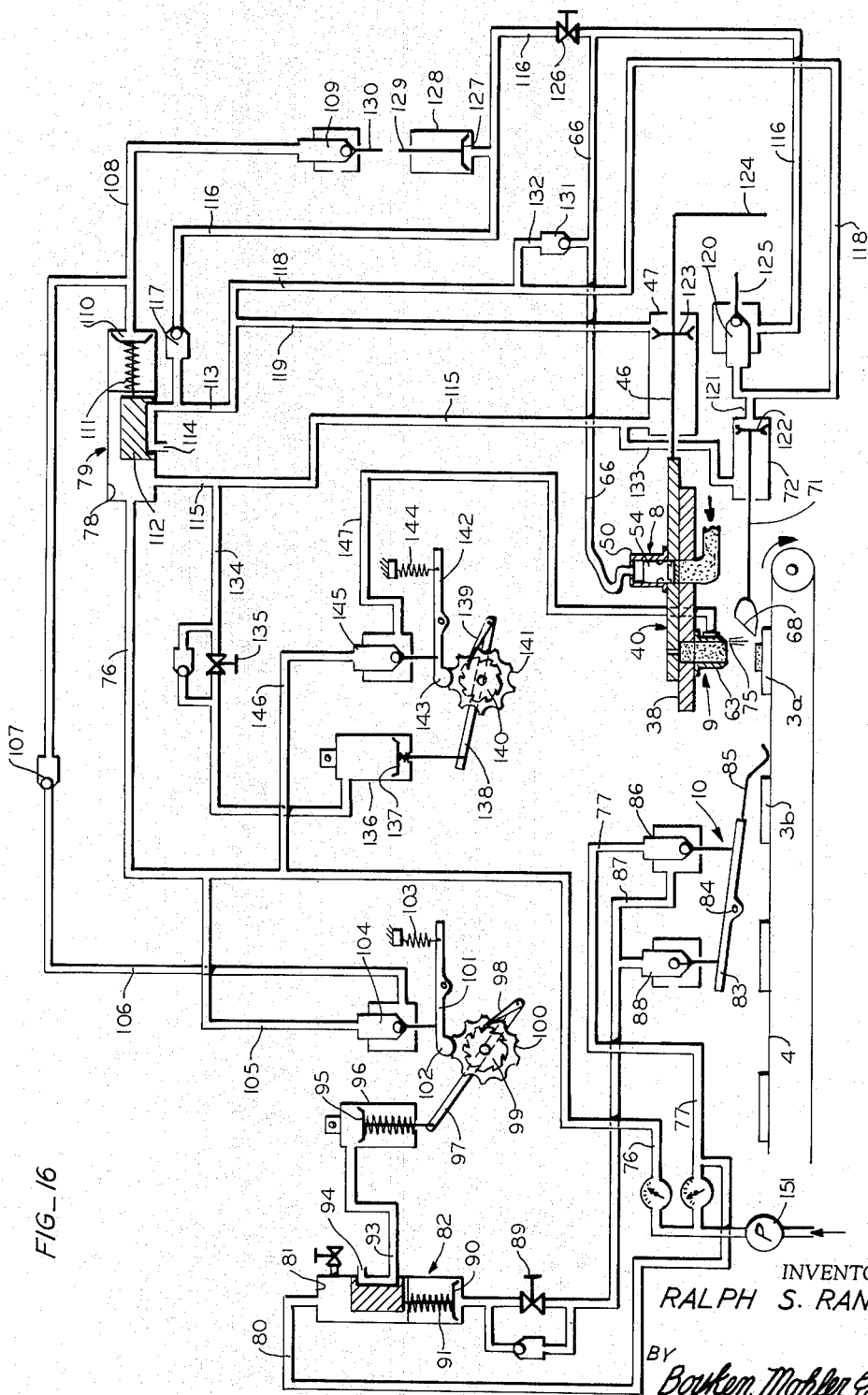

United States Patent Office 3,231,974
Patented Feb. 1, 1966

3,231,974
BUTTER MEASURING AND DISPENSING
APPARATUS
Ralph S. Randall, 3380 20th St., San Francisco, Calif.
Filed Dec. 30, 1963, Ser. No. 334,531
1 Claim. (Cl. 31—7)

This invention relates to a method of and apparatus for forming individual pats of butter from a butter supply, and dispensing such pats.

In connection with some food processing techniques, pats of buter or the like are applied to individual servings of a food product, such as a meat patty. It has heretofore been the practice to apply a butter pat to each individual product as it passes a selected station in the process by hand because butter has been available in the form of thin slabs each divided by score lines into a plurality of pats. The operator broke each slab into individual pats and deposited them, one by one, on the meat patties or the like conventionally carried past the station by a conveyor.

Not only is such a hand operation costly and time consuming, but it does not readily lend itself to changes in quantities as the food processor is dependent upon the butter supplier for pats of preselected volume.

In addition, prior attempts to form individual pats of butter at the site of application have met with such difficulties as are caused by the tendency of butter to expand as it is extruded from an open die and have been largely unsuccessful in accurately duplicating or rapidly adjusting the volume of the pats.

Therefore, it is an object of this invention to provide a method of and apparatus for forming a pat of butter of predetermined volume.

It is another object of this invention to provide a method of and apparatus for confining a predetermined portion of a butter supply and separating the portion so confined from the butter supply to form a pat of butter of accurate volume.

A further object of this invention is the provision of apparatus for forming and dispensing individual pats of butter onto food products moving along a conveyor.

A still further object of this invention is to provide an automatic control system for cyclically forming pats of butter and dispensing the pats one at a time onto food products moving along a conveyor.

Yet another object of this invention is the provision of a novel piston and cylinder arrangement in a butter pat forming apparatus.

It is yet a further object of this invention to provide a method of exerting positive control over butter during the various steps of forming individual pats of butter from a butter supply under pressure.

Still another object of this invention is to provide a method of and apparatus for forming individual pats of butter more economically and efficiently than the methods and apparatus of the prior art.

These and other objects and advantages of the method and apparatus of this invention will become more readily apparent from a consideration of the following description of the preferred embodiment thereof taken in conjunction with the accompanying drawings, in which:

FIG. 1 is a plan view, partly schematic, of one form of the apparatus of this invention including conveyor means for carrying products, onto each of which a pat of butter is deposited;

FIG. 2 is an end elevational view of the apparatus of FIG. 1;

FIG. 3 is a side elevational view of a portion of the cycling control apparatus, as seen from line 3—3 of FIG. 1;

FIG. 4 is a sectional view taken along line 4—4 of FIG. 1;

FIG. 5 is a sectional view of the forming chamber, taken along the line 5—5 of FIG. 1;

FIG. 6 is a sectional view taken along line 6—6 of FIG. 5;

FIG. 7 is a sectional view taken along the line 7—7 of FIG. 1;

FIG. 8 is a sectional view of the butter supply tank taken along the line 8—8 of FIG. 1;

FIG. 9 is a sectional view of a valve of butter supply tank, taken along the line 9—9 of FIG. 8;

FIG. 10 is a cross-sectional view of the forming chamber and dispensing apparatus similar to FIG. 4, shown in a first position prior to admittance of butter into the forming chamber;

FIG. 11 is a cross-sectional view similar to FIG. 10 showing a predetermined volume of butter admitted into the forming chamber;

FIG. 12 is a cross-sectional view similar to FIG. 10 showing the forming chamber moved to a second position carrying the formed pat of butter with it;

FIG. 13 is a cross-sectional view similar to FIG. 10 showing a stack of pats of butter deposited in the dispensing tube;

FIG. 14 is a cross-sectional view similar to FIG. 10 showing the forming chamber returned to the first position, with the lowermost pat in the dispensing tube being dispensed onto a product;

FIG. 15 is a sectional view taken along the line 15—15 of FIG. 1;

FIG. 16 is a schematic diagram of the control circuit for automatically operating the components of the apparatus of this invention in proper sequence.

In general, the forming and dispensing apparatus comprising the present invention are mounted on an elongated frame 1 (FIGS. 1, 2) for dispensing individual pats of butter 2 on individual servings of a product, such as meat patty 3. The patties are carried in spaced relation on a conventional belt conveyor 4 past the frame 1. A pat 2 is deposited on each patty 3 as it passes the frame and patty and pat are carried together on the conveyor to further processing stations and a packaging station (not shown) for wrapping.

A supply of butter is contained in a supply tank 5 (FIGS. 1, 8) adjacent the frame for charging a chamber 26 (FIG. 5) with butter through a conduit 7. The butter is forced under pressure from the charging chamber 26 into a chamber in a pat forming assembly 8 for filling the same with a predetermined volume of butter.

The filled forming chamber is then moved along the frame relative to the charging chamber to shear the butter therein from that in the charging chamber. Such movement causes the volume of butter in the forming chamber to be sealed therein, thus forming a pat of predetermined accurate volume. Continued movement of the forming chamber along the frame carries the pat to a dispensing station 9 (FIG. 1) where the pat is released from the forming chamber. The forming chamber is then returned to its initial position in alignment with the charging member for repeating the same operation. The previously formed pat is dispensed onto a meat patty passing underneath the dispensing station on the conveyor 4 by means of a tripping mechanism 10 (FIG. 2) which is activated upon being contacted by the meat patty.

Referring in detail to FIGS. 1, 2, the apparatus of this invention is supported on an elongated frame 1 having one end extending over and generally perpendicular to a conventional belt conveyor 4. The conveyor moves at a generally uniform rate and carries a plurality of patties 3 which are preferably arranged thereon in similarly oriented and aligned relation to each other. As each steak moves underneath the overhanging portion of the dispenser frame, the pattie is intercepted by a tripping mechanism, indicated generally at 10, to automatically initiate a butter pat forming and dispensing cycle, as will be later described.

The butter from which the pats are formed is supplied from a supply tank 5 (FIG. 8). The tank 5 is preferably in the form of an upright cylindrical barrel or container 11 open at its upper end. The open end of container 11 is closed during operation by a generally dome-shaped top 12, which may be removed for refilling the container with butter.

A movable, hollow pison 13 of substantially the same diameter as the inside of container 11 is positioned in the bottom of the container. Air or hydraulic fluid under pressure admitted against the underside of piston 13 through an inlet 14 from pump 6 (FIG. 1) moves the piston axially within the container. The piston 13 is dome-shaped to substantially conform to the shape of the top 12 (FIG. 8). The top 12 has an outlet 15 formed therein to allow butter in the tank 5 to be forced therethrough when the piston 13 is moved upwardly responsive to fluid pressure.

When the container 11 is first filled with butter there will be an air space between the top level of the butter and the underside of the top 12. It is preferable for proper operation of the forming and dispensing apparatus that all air be removed from the system to prevent the formation of air pockets in the butter as the pats are being formed. Care should therefore be taken that no air becomes trapped in cavities between the chunks of butter that are charged into container 11. Preferably such chunks should be in the form of cylinders slightly smaller than the diameter of tank 5.

The tank 5 includes a valve 16 mounted in the top 12 and connected to a vacuum pump 17 (FIG. 1) through line 18 (FIG. 9). The valve 16 has a chamber 19 communicating between the interior of tank 5 and line 18 to pump air out of the tank when the pump 17 is activated. A valve 160 in inlet 14 serves to close off pump 6 from piston 13 so that the piston will not be raised during the pumping of a vacuum in the upper portion of tank 5.

The chamber 19 is normally closed from tank 5 by a valve element 20 which is spring pressed into a seated position by a coiled tension spring 21 around the upper part of the stem 22 of element 20. The stem 22 projects through an opening in the upper wall of the chamber 19 and terminates in a head 24. The valve 16 is opened by manually pressing on the head 24 to depress element 20 and permit air in tank 5 to be drawn through the line 18 by the vacuum pump. When pressure on the head 24 is released, spring 21 causes element 20 to be retracted and seated thereby sealing tank 5 from the atmosphere.

A valve 148 is located in line 7 adjacent the end of butter oulet 15 (FIG. 8) to shut off the line 7 when the air in the top of tank 5 is being drawn off, as previously described. The valve 160 is then opened and pressure applied to piston 13 by pump 6 to raise the piston and compress the butter agains the top of tank 5, and the pressure urges the butter out of the outlet 15 and into the line 7.

The end of line 7 remote from the tank 5 terminates in a chamber 26 (FIG. 5) communicating at its upper end with the forming chamber, to be later described. The chamber 26 is ported by an air release valve 27 (FIGS. 1, 7) to permit the air ahead of the butter in line 7 and chamber 26 to be vented to atmosphere. Valve 27 includes a body member 28 (FIG. 7) threaded into a sidewall of chamber 26 and a chamber 29 opening into the interior of chamber 26. The chamber 29 is normally closed by a closure 30 which has a stem 31 extending axially through body member 28. The end of stem 31 extending beyond body member 28 is enclosed in a cap 32 which is mounted for sliding movement along body member 28. A compression spring 33 is positioned around the portion of stem 31 contained within cap 32 to resiliently urge the closure 30 to its normal closed position. When the cap 32 is manually pushed, closure 30 moves to an open position allowing the air within the chamber 26 to enter chamber 29 and be vented through openings 34 in the walls of body member 28. Butter issuing from the ports 34 indicates that all the air has been disposed and the chamber 26 is filled with butter. Cap 32 may then be released to allow closure 30 to close the chamber 29 due to the pressure of the spring 33.

The frame 1 includes a standard-supported, horizontal member 35 (FIGS. 1, 4) on which is secured an extension arm 36. One end of arm 36 is secured to member 35 by a tongue and groove and bolt connection 37. The charging chamber 26 is formed in the other end of arm 36 as an integral part thereof (FIG. 4).

An elongated base plate 38 is securely mounted on the upper side of arm 36 and has a substantially square opening 39 extending therethrough which is vertically axially aligned with charging chamber 26 to form a part thereof. Plate 38 extends longitudinally of arm 36 from its inner end adjacent connection 37 to its outer end extending outwardly of chamber 26.

The forming chamber assembly 8 is mounted on and carried by a slide member 40 extending longitudinally of plate 38 and comprising a pair of elongated plates 41, 42 secured together by bolts 43. At its inner end upper plate 41 is connected to a coupling member 44 by means of a tongue and groove and bolt connection 45. Member 44 is internally threaded for receiving a piston rod 46 of a pneumatic cylinder 47, which is secured to frame member 35 (FIG. 1).

Thus, because of the releasable connections 37 and 45, the forming chamber assembly 8 and the associated apparatus which is filled with butter, including charging chamber 26 and conduit 7, may be disconnected from the main frame of the apparatus and refrigerated during periods of nonuse without removing such butter and thereby requiring recharging for subsequent operation.

The slide member 40 is slidably reciprocated over the upper surface of plate 38 responsive to actuation of the cylinder 47. Said slide member is mounted between a pair of elongated, opposed side guides 48 (FIGS. 2, 4, 5) on top of each of which are mounted a pair of retaining rails 49 which overhang the edges of member 40.

Rails 49 and guides 48 are secured to base member 38 by bolts 150 and thereby maintain the slide member 40 in sliding relation to the plate 38. Plates 41, 42 are provided with a square opening 57 superimposed over opening 39 in one position (the rearmost) of member 40.

The pat forming assembly, indicated generally at 8, (FIGS. 4, 5) comprises an upstanding, generally hollow cylinder 50 secured to slide member 40 by means of a plurality of bolts 51 extending through an annular flange 52 on the base of the cylinder 50. Said cylinder has a central cylindrical bore 53 which is axially aligned with opening 57 and slidably receives a piston 54. The upper portion 55 of piston 54 is cylindrical and is in sliding engagement with the walls of the bore 53. An intermediate portion 56 of piston 54 is partly circular and partly square in cross section and the lower portion 56′ is square. Such portions are aligned with upper portion 55. The square portion 56′ is slidably received in the square opening 57 in slide member 40, which opening provides the pat forming chamber. An O-ring 60 on circular portion 55 serves to seal such portion in bore 53.

Chamber 57 and piston portions 56′ are preferably square because of the desirability of producing pats of butter in a square shape. Forming the pats in such shape in the chamber 57 eliminates later reforming of such pats.

The lowermost position of piston 54 is shown in FIGS. 4, 5 in which the lower surface of the piston and its square portion 56′ is level with the upper surface of plate 38. The height of lower portion 56' (to the lower surface of intermediate portion 56) is the same thickness of lower plate 42. The height of said intermediate portion is equal to the thickness of upper plate 41. Therefore, in such lowermost position segmental shoulders 67 (FIG. 6) formed at the juncture of upper circular portion 55 and intermediate portion 56, engage the upper surface of plate 41 (FIG. 4) at opposite sides of square opening 57, thereby limiting the downward movement of the piston.

Under the presure exerted by butter in charging chamber 26, piston 54 may move upwardly until the triangular shoulders 58 (FIG. 6) formed at the juncture of intermediate portion 56 and square portion 56' engage the lower edge of the walls of the chamber 53, indicated at 59 in FIG. 5.

In the embodiment illustrated, the maximum distance which the piston 54 can move is the thickness of the plate 42. This distance and the area of opening 57 establishes the maximum volume of the pat forming chamber.

It is preferable that the respective cross sectional areas of the circular portion 55 and the square portion 56' are equal in order to account for any butter which may leak from the forming chamber 57. Since the butter is forced into the forming chamber under pressure, it is virtually impossible to prevent slight leakage past the square and intermediate portions 56, 56' of piston 54. The O-ring 60 effectively seals the upper portion 55 from leakage to the upper end of bore 53.

Butter leaking past portion 56' and accumulating in cavities between the soulders 58 and the underside 59 of the cylinder wall when piston 54 is in the lowered position will flow to the cavities formed between shoulders 67 and the upper side of plate 40 (FIG. 11) when the piston is in the upper position. When the areas of portions 55 and 56' are equal, said cavities are equal in volume and no excess of butter can accumulate in either to interfere with the movement of the piston 54.

Since the volume of the forming chamber 57 is predetermined by the limits of movement of piston 54 and butter is admitted thereto under the constant pressure in tank 5, every pat formed in said chamber is of the same volume. Since substantially all air has been eliminated from the butter in tank 5, conduit 7, and charging chamber 26, the confining of the pat during forming in chamber 47 results in accurately sized pats of uniform volume. Preferably the vertical spacing between shoulders 58 and 67 is established by the maximum thickness of butter pat desired.

To produce a thinner pat of butter means for reducing the distance of upward travel of the piston 54 is provided by a bolt 61 (FIG. 5) threadedly received through the upper end of cylinder 50 and projecting into bore 53. A cover 62 seals the upper end of cylinder 53 and protects the upper portion of the bolt 61 extending above the housing 50 from accidental disturbance, when bolt 61 is screwed down a sufficient distance to contact the upper end surface of piston 54 before shoulders 58 and edge 59 engage. It limits the upward movement of said piston resulting in the formation of a thinner pat.

FIG. 10 shows the forming apparatus prior to admittance of butter into the forming chamber 57 with piston 54 in the lowermost position and chamber 26 charged with butter. FIG. 11 shows the piston 54 moved upwardly responsive to the pressure of the butter to thereby fill the forming chamber 57 with butter, as previously described. when the forming chamber 57 is thus filled, the cylinder 47 is actuated to move the slide member 40 in the direction of the arrow in FIG. 12. This movement shears the butter in the forming chamber from the butter in the charging chamber 26 and displaces the formed pat 2 therefrom. The upper boundary of charging chamber 26 is thus closed by the lower surface of plate 42, and a lower surface for the foming chamber 57 is provided by the upper surface of the plate 38. The pat 2 of butter is thus separated from the supply and carried in a confined chamber to a second position shown in FIG. 12, wherein the forming assembly 8 is aligned with the dispensing station 9.

The dispensing station 9 includes a hollow body member 63 (FIGS. 4, 12) which is secured depending from the outer end of plate 38 by countersunk bolts 64. Member 63 is provided with a vertically disposed internal bore 65 of substantially the same square cross section as chamber 57. The walls of bore 65 are preferably slightly converging downwardly so as to retain a pat of butter therein from falling out at the open lower end. Body member 63 thus forms a discharge tube into which the formed pats of butter are successively discharged when the forming assembly 8 is in the position shown in FIG. 12.

The piston 54 is urged downwardly to push each pat of butter from the forming chamber 57 into the discharge tube bore 65 by means of air admitted under pressure into cylinder bore 53 (FIG. 5) through an air line 66. The downward movement of the piston 54 is limited, as previously described, by the engagement of the shoulder 67 (FIG. 5) with the upper surface of plate 41. The thus discharged pat 2 of butter is pushed (FIG. 13) into bore 65. Subsequent operations of the pat forming, separating, and discharging cycle leads the pats 2 one on top of the other in the discharge tube, each subsequent pat pushing the preceding ones to the lower end of bore 65. When the tube is thus completely preloaded the discharge of another pat of butter forces the lowermost pat out of the bottom of the tube, as shown in FIG. 13. The open lower end of tube 63 is preferably spaced a minimum distance above the product 3 on conveyor 4 (FIGS. 2, 14).

In order to prevent air being trapped between the pats or between the upper pat and slide 40 as the discharge tube is being loaded, said slide is provided with a vent hole 164 (FIGS. 4, 14) communicating with the upper end of bore 65 when slide 40 is in the retracted position.

It has been found that when the discharge tube 65 is filled with pats of butter, as shown in FIGS. 13 and 14, the pats have a tendency to stick together and form a homogeneous slug of butter. This sticking tendency requires positive means to cleanly separate the lowermost pat from the next succeeding pat in order to properly dispense the lowermost pat onto the product 3 (FIG. 14).

The means for accomplishing this is illustrated in FIGS. 1 and 15 and comprises a slicing wire 68 carried generally on a horizontally extending bifurcated slide 69 which is secured to an L-shaped block 70. The end of the block 70 remote from the slide 69 is pivotally connected to the piston rod 71 of an air cylinder 72 by pivot pin 153 and clevis 154. The block 70 extends through an elongated slot 155 in a guide frame 73 which is clamped to the lower end of tube 63 and pivotally supports cylinder 72. Depending from either side of guide frame 73 are opposed ears 156 (FIG. 2). Pivot pins 157 extending through the lower end of each ear mount a generally horizontally extending guide plate 158 for pivoting about its center. Spaced edge guides 159, secured to the underside of the guide plate 158 slidably receive and support the slide 69 for reciprocation.

Stop limits 161 depending from stationary guide frame 73 adjacent either end of guide plate 158 limit pivotal movement of the guide plate, edge guides, and slide 68. A compression spring 162 extending between guide frame 73 and end of guide plate 158 remote from tube 63 urges said end of plate 158 downwardly and the other end into engagement with right hand stop limit 161 (FIG. 15).

Slide 69 is positioned horizontally with wire 68 at the left edge of and substantially level with the open end of tube 63 as shown in FIG. 15 before the lowermost pat 2a has been discharged. Actuation of cylinder 72 at such time initiates rightward movement of the piston rod 71, pivot pin 153, and block 70. Since guide plate 158 is pivoted about fixed pivot pin 157, and because of friction resistance between slide 69 and guides 159, the slide and its guide first pivot slightly in a clockwise direction until the remote end of guide frame 158 engages its stop 161. Further movement of piston rod 71 causes translation of slide 69 to the right in FIG. 15. This causes wire 68 to travel across the open end of tube 63 along the angled path (shown in FIG. 15 by the dot-dash line 163) slightly spaced from the open end of the discharge tube.

Thus, rightward movement positions the wire 68 at the right side of said tube for the return cutting stroke, and during said movement the wire is spaced from the butter in tube 65, thereby preventing undesirable accumulation of butter on the wire.

At the right hand end of the stroke, spring 162 tilts guide plate 158 against the right hand stop 161 adjusted to position wire 68 at substantially the same horizontal level as the open end of the discharge tube.

With wire 68 thus positioned and after discharge of the lowermost pat 2a out of the end of tube 65, actuation of cylinder 72 to urge piston rod 71 and thence slide 69 to the left in FIG. 15 draws the wire between the pat 2a (FIG. 13) projecting out of tube 63 and the lowermost pat 2b in the tube. Such action positively separates the pat 2a from the next succeeding pat 2b (FIG. 14) for deposit of the former on the product 3. It will be understood that immediately prior to the last mentioned actuation of the cylinder 72 the lowermost pat 2a has been pushed out of the discharge tube 63, as seen in FIG. 13, but remains connected to the next succeeding pat 2b due to the aforementioned sticking tendency. The wire 68 thus cuts through the slug of butter protruding from tube 63 to separate a pat of equal volume to that pushed into the upper end of said tube.

When the wire 68 is drawn completely across the open end of the discharge tube 63, the butter pat is separated and carried by the wire slightly to the left of bore 65 in FIG. 15. The butter pat tends to stick to the wire 68 and may fall in an erratic manner and/or land improperly on the product 3. In order to assure proper deposition of the pat, an elongated air nozzle 75 (FIG. 15) is provided adjacent the left edge of the discharge end of tube 63 in a location to direct a blast of air against wire 68 and the pat carried thereby. As will be later described, the blast of air from nozzle 75 is preferably timed at the instant that wire 68 has separated the butter pat and arriveed at the left side (FIG. 15) of tube 63. Thereafter slide 69 is returned by cylinder 72 to its initial position.

The operation of the forming and dispensing apparatus is automatically controlled by a combination pneumatic and mechanical system semi-schematically illustrated in FIG. 16. In the position shown the leading product 3a has received a pat of butter. The next product 3b is approaching the tripping mechanism 10 on the conveyor 4.

Air under pressure is supplied to the pneumatic system from a source indicated by the pump 151 into lines 76 and 77. The air in line 76 enters the chamber 78 in a master cylinder slide valve 79. A line 80 branching off line 77 enters the chamber 81 of master cylinder slide valve 82.

The tripping mechanism 10 comprises a trip bar 83 pivoted at its center about a pin 84 and having a contact arm 85 extending from one end thereof. The contact arm 85 is disposed over conveyor 4 (FIGS. 1, 2) to engage the leading edge of the steak 3b (FIG. 16) in order to pivot the trip bar 83 in a counterclockwise direction about pin 84 upon such engagement. This movement of the trip bar 83 opens a ball valve 86 connected to admit air from line 7 into a line 87. By the same motion bar 83 closes a ball valve 88 connected to line 87 and normally exhausting to atmosphere. At its outer end line 87 connects through a regulator 89 to valve 82 on the opposite side of its piston 90 from line 80. The pressure of the air against piston 90 compresses the spring 91 and moves the slide 92 thus opening a line 93 connected thereto to chamber 81 and closing the exhaust vent 94 normally exhausting line 93 to atmosphere.

The air thus admitted into line 93 enters a cylinder 96 moving its spring-urged piston 95 downwardly to thereby rotate a centrally pivoted arm 97, to one end of which the rod of piston 95 is connected, in a counterclockwise direction. A pawl 98 (FIGS. 3, 16), connected to the other end of arm 98, engages a ratchet wheel 99 causing it to rotate, thereby also causing an axially grooved wheel 100, fixed to wheel 99 and mounted with arm 97 on the same shaft, to rotate. An arm 101, pivoted at its center to control system housing 152 as is arm 97, has a follower at one end which normally rests in one of the arcuate grooves in wheel 100. When the wheel 100 is caused to rotate the follower 102 rides up onto a raised land between the grooves of wheel 100 thereby causing the arm 101 to swing in a clockwise direction, pulling against a tension spring 103 connecting the other end of arm 101 to housing 152 (FIG. 3).

This tilting of arm 101 opens the ball valve 104 to which it is connected to allow air to communicate from line 105, which branches off line 76, with a line 106. Line 106 includes a one-way check valve 107 and communicates with a line 108. A ball valve 109 in one branch of line 108 is normally closed thereby forcing the air into the other branch of line 108 communicating with one side of the piston 110 in cylinder valve 79. This causes the spring 111, which normally holds piston 110 at the right end of cylinder 78 (FIG. 16), to be compressed thus moving the slide 112 to open a line 113 to the air in valve 79 from line 76 and to close the exhaust 114 and line 115. The air in line 113 is prevented from entering connected line 116 by a one-way check valve 117.

Line 113 communicates with lines 118 and 119 so that the air flows through line 118 to a branch having a normally closed ball valve 120. Another branch 121 at line 118 communicates with one side of the piston 122 in cylinder 72 (FIGS. 15, 16). The movement of the piston 122 moves the piston rod 71 and the wire slicer 68 to its initial position shown in FIG. 15.

At the same time the air in line 119 communicates with one side of piston 123 in cylinder 47 (FIGS. 1, 4, 16) causing the piston to move the slide 40 and the forming apparatus 8 from its initial position adjacent chamber 26 (FIGS. 10, 11) to the terminal position (FIG. 12) in which it is adjacent discharge tube 63.

As the slide 40 moves to its second position, an arm 124 (FIGS. 1, 3, 16) on the end of rod 46 remote from slide 40 engages the tappet 125 of ball valve 120 thereby opening the same to the air in line 118. Thus air flows through valve 120 to a line 116 and connected branch line 66 to cause the piston 54 in the forming assembly 8 to move downwardly and discharge the formed pat of butter into the discharge tube 63, as previously described.

Line 116 continues through a regulator 126 and to one side of the piston 127 in a cylinder 128, thereby causing the piston rod 129 to move upwardly. Rod 129 moves upwardly a predetermined distance until it engages the end of the tappet 130 of valve 109 thus providing a delay to allow for the completion of the transfer of the pat of butter from the forming assembly 8 to the discharge tube 63. When the valve 109 is thus opened it allows the air in line 108 to be exhausted to atmosphere, thus allowing the spring 111 in valve 79 to expand and move the slide 112 to its initial position (FIG. 16), thereby connecting line 113 to exhaust through opening 114.

At this time line 115 is open to the interior of cylinder 78 and the air under pressure in line 76. Likewise, lines 118 and 119 are open to the atmosphere, thus releasing the pressure from one side of piston 123 in cylinder 47 and allowing the air in line 66 to vent to the atmosphere through check valve 131 and line 132.

The air in line 115 enters cylinder 47 to return the piston 123 and slide 40 to its original position shown in FIG. 14. Line 133 branches off line 115 to communicate with the other end of cylinder 72, thus moving the piston 122 to the right, as shown in FIG. 16. Such movement causes the wire 68 to slice across the open end of tube 63 and separate the lowermost pat of butter from its adjacent pat of butter in the discharge tube. It will be noted that the piston 122 is allowed to so move due to the air pressure in line 118 being released through the exhaust vent 114.

The opening of line 115 also permits air to flow through a line 134 past a regulator 135 into a cylinder 136. This causes the piston 137 in said cylinder to be moved downwardly, thus causing an arm 138 to which it is connected, to rotate in a counterclockwise direction about its central pivot. A pawl 139 connected to the other end of arm 138 turns a ratchet wheel 140 which in turn turns a grooved wheel 141 mounted on the same pivot with arm 138 and wheel 140. A pivoted arm 142 having a follower at one end 143 normally riding in one of the grooves of wheel 141 is thus caused to tilt in a clockwise direction upon the follower being lifted over a raised land between the grooves of wheel 141 against the pressure of tension spring 144 connected to the other of arm 142. This tilting of arm 142 rapidly opens the valve 145 to which it is connected to allow the air in line 146, which branches from line 76, to enter the line 147 communicating with nozzle 75 (FIGS. 15, 16) and thus direct a quick blast of air against the pat of butter being separated by wire 68 from the remaining pats in discharge tube 63.

As the wheel 141 continues to rotate the follower on arm 142 immediately falls into initial position in a groove in said wheel to close valve 145 and thus shut off the air to line 147. This returns the system to its original condition and completes a cycle of operation.

It will be seen that forming of each butter pat is accomplished in a complete enclosed chamber 57 under constant pressure. No matter what the time interval between cycles of operation of the forming apparatus, the butter has no opportunity to follow its normal tendency to "creep." In prior art systems in which a bar of butter is extruded and sliced into pats at intervals, the thickness of each pat may vary because of this tendency of the butter under pressure to continually flow out of the extruding die. The volume of butter in dispensing tube 63 is so small that it does not creep to any appreciable extent, especially since it is not under pressure.

Thus there has been described apparatus for and a method of automatically forming and dispensing pats of butter of uniform, predetermined volume. While the invention has been described with reference to a preferred embodiment of such apparatus, it will be understood that it is not limited thereto, but may be changed or altered without departing from the spirit and scope of the invention as defined in the following claim.

I claim:

Apparatus for forming individual pats of butter from a bulk supply, comprising:
(a) an elongated frame;
(b) a forming chamber supported for movement along said frame;
(c) means for moving said chamber between a first position in which it is open to said supply for receiving a predetermined volume pat of butter therein and a second position separated from said supply;
(d) an open-ended discharge tube supported on said frame at said second position for receiving successive pats from said forming chamber in a stack of pats;
(e) means for discharging each said pat from said forming chamber into one end of said discharge tube and thereby urging a preceding pat in said stack out of the other end of said tube;
(f) cutting means mounted for movement across and adjacent said other end of said tube for severing said preceding pat from said stack;
(g) means for moving said cutting means from one side of said tube to the other;
(h) means at said other side of said tube for directing a blast of air at said cutting means for releasing said preceding pat therefrom and for maintaining the disposition thereof during depositing the same; and,
(i) control means including a tripping mechanism supported on said frame controlling the movement of said forming chamber and said cutting means and the timing of said air blast responsive to tripping of said mechanism.

References Cited by the Examiner
UNITED STATES PATENTS

| | | | |
|---|---|---|---|
| 1,473,590 | 11/1923 | Wallace. | |
| 1,580,498 | 4/1926 | Knox et al. | 31—6 |
| 1,823,501 | 9/1931 | Messinger | 83—98 |
| 2,182,656 | 12/1939 | Bruggimann | 31—24 |
| 2,774,104 | 12/1956 | Miller | 31—7 X |

SAMUEL KOREN, *Primary Examiner.*

HUGH R. CHAMBLEE, *Examiner.*